Aug. 10, 1948.   R. K. HOPKINS   2,446,929
METHOD AND APPARATUS FOR ELECTRICALLY
HEATING MATERIAL
Filed Dec. 22, 1945
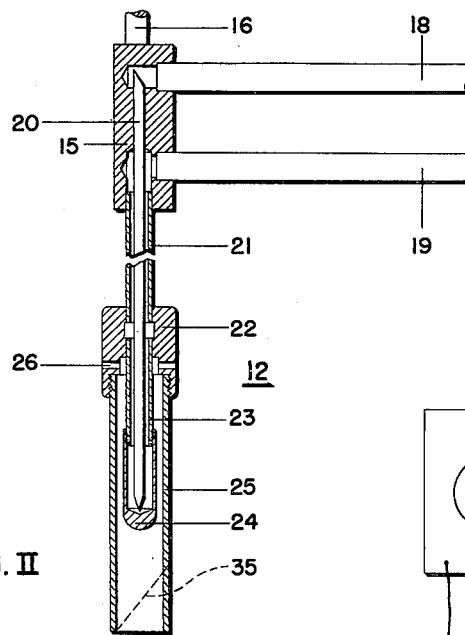
FIG. II
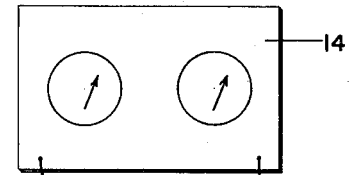
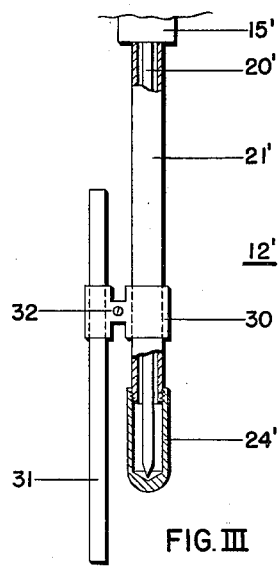
FIG. III
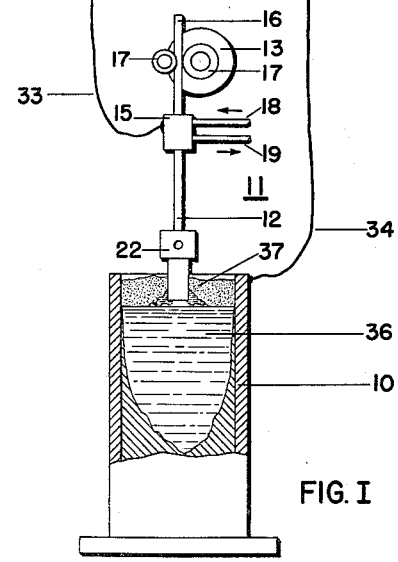
FIG. I
ROBERT K. HOPKINS
*INVENTOR.*
BY Virgil F. Davies
*ATTORNEY*

Patented Aug. 10, 1948

2,446,929

UNITED STATES PATENT OFFICE 2,446,929

METHOD AND APPARATUS FOR ELECTRICALLY HEATING MATERIAL

Robert K. Hopkins, New York, N. Y., assignor to The M. W. Kellogg Company, New York, N. Y., a corporation of Delaware Application December 22, 1945, Serial No. 636,991

12 Claims. (Cl. 219—15)

This invention relates to operations in which heat is generated by the discharge of electric current from the end of an electrode maintained beneath the surface of a depth of molten flux.

I have heretofore proposed, in my prior Patent No. 2,370,467 issued February 27, 1945, to generate heat by discharging electric current from an electrode tip, formed of metal of high heat conductivity and hollowed for the circulation of a cooling medium therethrough, while the electric current discharge portion of said tip is maintained beneath the surface of a depth of molten flux which shields it from the atmosphere. This proposal, if carried out as disclosed, is entirely satisfactory and the electrode tip is of such long life as to be substantially indestructible. Difficulties are, however, experienced when it is attempted to initiate the heat generating operation with solid flux or with flux which, though molten, does not permit rapid initial submergence of the electrode tip therein. Such flux does not properly shield the electric discharge portion of the tip and permits arcing which results in rapid wear and ultimate destruction of the tip.

I have attempted to solve this problem by providing a molten flux source from which the necessary quantity of molten flux may be transferred to the container of the operation just before the operation is initiated. This expedient has not been especially satisfactory as the heat loss which takes place during the interval in which the flux is removed from the molten flux source and the operation is initiated generally cools the flux to such a degree that it does not properly protect the discharge tip. Also, the molten flux source is an item of considerable expense and materially increases the cost of the operation.

It is a primary object of this invention to provide a simple and effective method and apparatus for initiating operations of the character mentioned with solid flux, or with flux which though molten is not in condition to effectively shield the electrode tip, without setting up conditions which result in the rapid wear and ultimate destruction of the electrode tip.

It is also a primary object of this invention to provide a simple and effective method and apparatus for initiating operations of the character mentioned with solid flux, or with flux which though molten will not effectively shield the electrode tip, in which a molten pool of flux is produced, of proper volume and at proper temperature, at the situs of the operation and the electrode tip submerged beneath the surface thereof without setting up conditions which result in rapid wear and ultimate destruction of the electrode tip.

It is a further important object of the invention to provide a novel method, as well as novel apparatus for carrying it out in practice, for initiating operations of the character mentioned in which a molten pool of flux of proper volume and at proper temperature is produced by the discharge of electric current from the end of a supplementary consumable electrode tip so arranged that during the formation of the molten flux pool all of the current is discharged from its end and after a proper flux pool has been produced, the electrode tip of metal of high conductivity enters the pool and progressively takes over the discharge of the electric current.

The further objects, advantages, and features of the invention will become apparent from the following description of the invention taken with the accompanying drawings, in which, Fig. I is a diagrammatic view illustrating a heat producing operation carried on in accordance with the invention, Fig. II is a front view of an electrode arrangement, parts being shown in section, including a present preferred embodiment of the apparatus of the invention, and Fig. III is a view similar to Fig. II showing an alternative embodiment of the apparatus of the invention.

The invention is of general application and may be employed in carrying out a wide variety of operations in which metals, or other materials, are subjected to the heat of an electric current discharge. For the purposes of this disclosure, the invention will be described in connection with the electrical hot-topping of metal ingots. By "electrical hot-topping" is meant operations of the character disclosed in my prior Patent No. 2,370,467, above referred to, in which the solidification of ingot metal is controlled by the addition of heat thereto derived by the discharge of electric current under a blanket of molten flux.

The electrical hot-topping operation is carried out in a mold 10 which may be of any preferred kind. Mold 10 may be the usual metal ingot mold as indicated or it may be a special purpose mold such as a water-cooled mold whose shaping wall is formed of copper or other metal of high heat conductivity. The heat is supplied by an electrode device 11 that includes electrode 12, a motor means 13 for moving electrode 12 axially, arc control arrangements to control the functioning of motor means 13 to maintain an electric current discharge of desired characteristics, a a source of current for motor means 13, and a source of current for electrode 12. The arc control arrangements may be of the kind usually employed in the electric furnace and welding arts for controlling electrode feed motors. For convenience, the motor means, the electric current supply sources, and the arc control arrangements will be considered as located in back of panel 14 which includes the usual current and voltage indicating instruments.

Electrode 12, shown in detail in Fig. II, includes a top member 15 to which is united a rod 16, that passes between the feed rollers 17 of motor means 13, by means of which electrode 12 is moved axially as required to maintain a discharge of predetermined characteristics. Top member 15 includes lateral bores into which are tapped cooling medium inlet pipe 18 and cooling medium outlet pipe 19. Top member 15 also includes a central bore, in which is supported the upper portion of tube 20, and a bottom bore into which is tapped the upper end of pipe nipple 21. The upper end of tube 20 opens into the bore into which cooling medium inlet pipe 18 is tapped so that the cooling medium may flow into tube 20. The bottom bore crosses the lateral bore into which cooling medium outlet pipe 19 is tapped so that the cooling medium may flow from nipple 21 into outlet pipe 19.

The lower end of nipple 21 is tapped into the top end of the central bore of fitting 22. This central bore enlarges in diameter in steps from its top end to its bottom end. A second nipple 23 is tapped into the bottom end of the portion of smallest diameter of the central bore. The lower end of nipple 23 is tapped into the open end of electrode tip 24. Electrode tip 24 is made of copper or other metal of high heat conductivity. Tube 20 extends to the bottom of tip 24 and is arranged as described in my prior patent, above identified, to jet the cooling medium against the inner wall of tip 24.

The walls of the portion of the central bore of fitting 22 of maximum diameter are threaded to receive the threaded end of pipe nipple 25 which encircles nipple 23 and tip 24 and extends a substantial distance beyond the bottom end of tip 24. Nipple 25 serves as a starting electrode tip and is made long enough to assure the formation of a pool of molten flux of proper volume and of a proper temperature to effectively shield tip 24 when tip 24 is moved into it. Nipple 25 is preferably made of metal of the same, or approximately the same, analysis as the metal to be hot-topped; in any event, nipple 25 is made of a material that will permit electric current to be discharged from its end and will be consumed by the heat generated by the electric current discharge.

The walls of the portion of the central bore of fitting 22 of intermediate diameter are pierced by radial bores 26. Bores 26 are provided to permit gases that may be liberated in the region of the electric current discharge while electric current is discharged from the end of nipple 25 to be vented out of the space between nipple 25 and electrode tip 24. In designing the structure just described, it is highly desirable to so space nipple 25 and electrode tip 24 that the heat generated by the electric current discharge from the end of nipple 25 is concentrated in the region of the flux which tip 24 will enter; however, care must be taken that nipple 25 and tip 24 are sufficiently spaced apart that there will be no current flow from one to the other when tip 24 approaches the flux or is initially in contact therewith as such current flow usually produces an air supported arc which detrimentally affects tip 24.

Electrode 12' of Fig. III has the same upper structure as electrode 12 just described. Electrode 12', however, does not include a fitting 22 and nipple 23. In electrode 12' nipple 21', corresponding to nipple 21 of Fig. I, extends from top member 15' to discharge tip 24' and has its lower end tapped into the top of discharge tip 24'. Tube 20', like tube 20, carries the cooling medium from the cooling medium inlet pipe to the bottom wall of tip 24'. A split clamp 30 encircles nipple 21' adjacent the lower end thereof and carries starting electrode tip 31. A bolt 32 is employed to fasten clamp 30 in position. In place of clamp 30 any similar preferred support means may be employed.

Starting electrode tip 31, like nipple 25, is made of consumable material and may be of carbon, graphite, metal, etc. When starting electrode tip 31 is made of metal it is preferably of the same, or similar, analysis as the metal to be treated. Starting electrode tip 31 extends beyond the end of tip 24' a sufficient distance to assure that during the consumption of the portion thereof beyond tip 24' a pool of molten flux of sufficient size and at a proper temperature is produced to effectively shield tip 24' when introduced therein. Starting electrode tip 31 is spaced close to tip 24' so that the heat generated by the electric current discharged from its end will be concentrated in the region that tip 24' is to enter, however, electrode tip 31 is sufficiently spaced from tip 24' so that current will not flow from one to the other of them when tip 24' approaches and enters the flux.

The electrode device 11 is connected by a cable 33 to one side of the current supply, cable 33 being connected to member 15 for instance, while the mold is connected to the other side of the current supply by a cable 34. To facilitate starting, the starting electrode tips 25 and 31 may have their ends cut on a skew, as by line 35 of Fig. II, to facilitate their entrance into the flux. Prior to the commencement of the hot-topping operation, electrode device 11 is positioned relative to mold 10 so that it may quickly have its discharge end introduced therein.

Molten metal 36 is deposited in mold 10, in any preferred way, until it has attained a predetermined level therein. When the mold 10 is filled as required, electrode device 11 is swung into position, the cooling medium circulated therethrough and the electrode current circuit closed for starting. At this time, some or all of flux 37 may be placed on metal 36. Flux 37 may be of any preferred composition; when the metal 36 is a ferrous metal the flux may be some form of calcium silicate. Motor means 13 is then set in operation and electrode device 11 lowered into mold 10. It is usually a simple matter for the starting tip 25, or 31, to penetrate the flux when it is in the dry comminuted condition and reach the molten metal 36 to start the current discharge as molten metal 36 readily permits movement of flux 37 but if difficulty is experienced and the skew cut electrode end does not eliminate it, the operation may be started on bare metal 36 or a hole may be left in the flux blanket 37 for entrance of the starting electrode tip 25, or 31.

If flux 37 is in the molten condition it will be sufficiently conductive to enable the electric current discharge to be started by merely bringing starting electrode tip 25, or 31, in contact with it. In any event, after the electrode circuit is shorted, motor means 13 will raise electrode device 11 to initiate the electric current discharge. The remainder of the flux 37, if any, may then be added.

The discharge of electric current from the end of starting electrode tip 25, or 31, generates heat at a high temperature level. The effect of this heat generation is to supply heat to metal 36, to fuse and superheat flux 37 and to fuse starting electrode tip 25, or 31. As the discharge continues, a pool of highly fluid, highly superheated flux will form below starting electrode 25, or 31, and electrode tip 25, or 31, will become shorter. If starting electrode tip 25, or 31, has been chosen of the proper length, the highly heated flux pool will be of a proper size and at a proper temperature to effectively shield discharge tip 24, or 24', when starting electrode tip 25, or 31, has been consumed to the point that the molten flux contacts discharge tip 24, or 24'. When this happens it is to be noted that electric current will be discharged from the ends of both starting tip 25, or 31, and discharge tip 24, or 24'. This dual discharge will continue with discharge tip 24, or 24', discharging an increasing proportion of the electric current until finally starting tip 25, or 31, will be so shortened that the space between its end and the molten flux 37 will be too long to permit a discharge of current. At such time, discharge tip 24, or 24', will be properly submerged in molten flux 36 and will discharge all of the current. From this point on, the hot-topping operation will go forward as described in my prior patent above-identified.

I claim:

1. In the method of treating material by the discharge of electric current, beneath the surface of a depth of molten flux, from the end of an electrode substantially indestructible when its discharge end is submerged in a depth of molten flux, the steps comprising, depositing a depth of flux on the material to be treated, discharging electric current from the end of an electrode while maintaining said indestructible electrode out of contact with said flux to heat a volume of said flux to a molten condition, submerging the discharge end of said substantially indestructible electrode in said volume of molten flux, and discharging electric current from said flux submerged discharge end.

2. In the method of treating material by the discharge of electric current, beneath the surface of a depth of molten flux, from the end of an electrode substantially indestructible when its discharge end is submerged in a depth of molten superheated flux, the steps comprising, depositing a quantity of dry solid flux on the material to be treated, fusing a volume of said flux by the discharge of electric current from the end of a consumable electrode while maintaining said indestructible electrode out of contact with said flux, moving the discharge end of said substantially indestructible electrode into said volume of molten flux, and discharging electric current from the flux submerged discharge end of said substantially indestructible electrode.

3. In the method of treating material by the discharge of electric current, beneath the surface of a depth of molten flux, from the end of an electrode substantially indestructible when its discharge end is submerged in a depth of superheated flux, the steps comprising, depositing a quantity of flux on the material to be treated, superheating a volume of said flux by the discharge of electric current from the end of a consumable electrode while maintaining said indestructible electrode out of contact with said flux, moving the discharge end of said substantially indestructible electrode into said volume of superheated flux while discharging electric current from the flux submerged portion thereof, and adjusting the current discharged from said portion from a minimum at initial submergence to a maximum when the required portion of said discharge end of said substantially indestructible electrode is submerged.

4. In the method of treating material by the discharge of electric current, beneath the surface of a depth of molten flux, from the end of an electrode substantially indestructible when its discharge end is submerged in a depth of superheated flux, the steps comprising, depositing a quantity of flux on the material to be treated, superheating a volume of said flux by the discharge of electric current from the end of a consumable electrode electrically connected to said substantially indestructible electrode while maintaining said indestructible electrode out of contact with said flux, moving the discharge end of said substantially indestructible electrode into said volume of superheated flux while discharging electric current from the flux submerged portion thereof, and adjusting the electric current discharges from said electrodes whereby the current discharged from said substantially indestructible electrode progressively increases from a minimum at initial contact with the molten superheated flux to a maximum when the desired portion thereof is submerged.

5. In the method of treating material by the discharge of electric current, beneath the surface of a depth of molten flux, from the end of an electrode substantially indestructible when its discharge end is submerged in a depth of superheated flux, the steps comprising, depositing a quantity of flux on the material to be treated, superheating a volume of said flux by the discharge of electric current from the end of a consumable electrode electrically connected to said substantially indestructible electrode while maintaining said indestructible electrode out of contact with said flux, moving the discharge end of said substantially indestructible electrode into said volume of superheated flux while discharging electric current therefrom until the discharge end of said indestructible electrode is submerged in said volume of superheated flux, and progressively increasing the spacing between the end of said consumable electrode and the material treated after initial immergence of said substantially indestructible electrode in said flux to progressively diminish the electric current discharged from the end of said consumable electrode.

6. In the method of treating material by the discharge of electric current, beneath the surface of a depth of molten flux, from the end of an electrode substantially indestructible when its discharge end is submerged in a depth of superheated flux, the steps comprising, depositing a quantity of flux on the material to be treated, superheating a volume of said flux by the discharge of electric current from the end of a consumable electrode electrically connected to said substantially indestructible electrode and movable therewith while maintaining said indestructible electrode out of contact with said flux, maintaining an electric current discharge of substantially constant characteristics from the end of said consumable electrode by moving it towards said flux whereby said substantially indestructible electrode is moved toward and ultimately into said flux, and continuing the movement of said electrodes into said flux to maintain the same electric current flow after initial contact of said substantially indestructible electrode with said flux whereby the current discharged from said indestructible electrode will progressively increase until it alone will discharge all of the current.

7. In the method of treating material by the discharge of electric current beneath the surface of a depth of molten flux, from the end of an electrode substantially indestructible when its discharge end is submerged in a depth of superheated flux, the steps comprising, depositing a quantity of flux on the material to be treated, superheating a volume of said flux while maintaining said indestructible electrode out of contact with said flux by the discharge of electric current from the end of a consumable electrode electrically connected to said substantially indestructible electrode, movable therewith and extending toward said flux a substantial distance beyond the end of said substantially indestructible electrode, maintaining an electric current discharge of substantially constant characteristics by moving said electrodes towards said flux as said consumable electrode is consumed to ultimately move said substantially indestructible electrode a desired distance into said flux and to progressively diminish the current discharge from the end of said consumable electrode while progressively increasing to a maximum the current discharged from the end of said indestructible electrode.

8. An electrode device adapted to be connected to a source of electric current, said device including an elongated body member having an enlarged lower end, a hollow discharge tip of metal of high heat conductivity, means supporting said hollow discharge tip centrally from the end of said enlarged end, means for circulating a cooling medium through said tip to render it substantially indestructible when its current discharge portion is submerged in molten flux capable of shielding it from the atmosphere, and an elongated open-ended hollow destructible metal electrode supported from said enlarged end encircling said tip and extending a substantial distance beyond said tip.

9. An electrode device adapted to be connected to a source of electric current, said device including an elongated body member having an enlarged lower end, a hollow discharge tip of metal of high heat conductivity, means supporting said hollow discharge tip centrally from the end of said enlarged end, means for circulating a cooling medium through said tip to render it substantially indestructible when its current discharge portion is submerged in molten flux capable of shielding it from the atmosphere, and an elongated open-ended hollow destructible electrode removably united to said enlarged end, said destructible electrode encircling said tip and extending a substantial distance beyond said tip, said enlarged end including passageways in the walls thereof venting the space between said tip and said electrode to the atmosphere.

10. An electrode device adapted to be connected to a source of electric current, said device including a hollow body member having an enlargement intermediate its ends, a hollow discharge tip of metal of high heat conductivity removably united to the lower end of said body member, means for circulating a cooling medium through said tip to render it substantially indestructible when its current discharge portion is submerged in molten flux capable of shielding it from the atmosphere, and an elongated open-ended hollow destructible metal electrode encircling said tip and the lower end of said body member and removably united to said enlargement, said destructible electrode extending beyond the end of said tip.

11. An electrode device adapted to be connected to a source of electric current, said device including an elongated hollow body member, a hollow fitting united to the lower end of said body member, a second hollow member united to said fitting forming a continuation of said hollow body member, a hollow current discharge tip of metal of high heat conductivity removably united to the lower end of said body member, means for circulating a cooling medium through said tip to render it substantially indestructible when its current discharge portion is submerged in molten flux capable of shielding it from the atmosphere, and an elongated open-ended hollow destructible metal electrode encircling said second hollow member and said tip, said destructible electrode being removably united to said fitting.

12. An electrode device adapted to be connected to a source of electric current, said device including an elongated hollow body member, a hollow fitting united to the lower end of said body member, a second hollow member united to said fitting forming a continuation of said hollow body member, a hollow current discharge tip of metal of high heat conductivity removably united to the lower end of said body member, means for circulating a cooling medium through said tip to render it substantially indestructible when its current discharge portion is submerged in molten flux capable of shielding it from the atmosphere, and an elongated open-ended tubular destructible electrode encircling said second hollow member and said tip, said tubular electrode being removably united to said fitting, said tip and said tubular electrode being sufficiently spaced to prevent flow of electric current from one to the other when said tip initially enters the flux, said fitting having passageways therein venting the space between said tip and said tubular electrode to the atmosphere.

ROBERT K. HOPKINS.

REFERENCES CITED

The following references are of record in the file of this patent:

UNITED STATES PATENTS

| Number | Name | Date |
|---|---|---|
| 858,400 | Von Kugelgen et al. | July 2, 1907 |
| 1,085,951 | Strohmenger | Feb. 3, 1914 |
| 1,298,590 | Smith | Mar. 25, 1919 |
| 1,481,854 | Armstrong | Jan. 29, 1924 |
| 1,898,060 | Noble | Feb. 21, 1933 |
| 1,955,726 | Archer et al. | Apr. 24, 1934 |
| 2,059,236 | Holslag | Nov. 3, 1936 |
| 2,121,693 | Henderson | June 21, 1938 |
| 2,278,569 | Shrubsall | Apr. 7, 1942 |
| 2,370,467 | Hopkins | Feb. 27, 1945 |

FOREIGN PATENTS

| Number | Country | Date |
|---|---|---|
| 497,133 | Great Britain | Dec. 13, 1938 |